United States Patent [19]

Fournier, Jr. et al.

[11] Patent Number: 4,703,287

[45] Date of Patent: Oct. 27, 1987

[54] PHASE MODULATOR FOR FIBER-OPTIC SENSORS

[75] Inventors: Joseph T. Fournier, Jr., Glastonbury; Richard E. Swarts, Simsbury, both of Conn.

[73] Assignee: United Technologies Corporation, Hartford, Conn.

[21] Appl. No.: 768,308

[22] Filed: Aug. 22, 1985

[51] Int. Cl.$^4$ .......................... G02F 1/05; G02B 5/08
[52] U.S. Cl. ..................................... 332/7.51; 356/350
[58] Field of Search ....................... 332/7.51; 356/350; 324/96; 367/149

[56] References Cited

U.S. PATENT DOCUMENTS

| | | | |
|---|---|---|---|
| 4,386,853 | 6/1983 | Ljung | 356/350 |
| 4,410,275 | 10/1983 | Shaw et al. | 356/350 |
| 4,411,526 | 10/1983 | Chown et al. | 356/350 |
| 4,440,498 | 4/1984 | Sheem | 356/350 |
| 4,442,414 | 4/1984 | Carter | 356/350 |
| 4,477,723 | 10/1984 | Carome et al. | 324/96 |
| 4,486,657 | 12/1984 | Bush | 367/149 |
| 4,564,293 | 1/1986 | Newton et al. | 356/350 |

OTHER PUBLICATIONS

R. Ulrich, "Fiber-Optic Rotation Sensing with Low Drift" Optics Letters 5, pp. 173-175 (1980).
D. E. N. Davies and S. Kingsley, "Method of Phase Modulating Signals in Optical Fibers: Application to Optical Telemetry Systems," Electronics Letters 10, pp. 21-23 (1974).
D. A. Jackson, R. Priest, A. Dandridge and A. B. Tveten, "Elimination of Drift in a Single-Mode Optical Fiber Interferometer Using a Piezoelectric Stretched Coiled Fiber," Applied Optics 19, pp. 2926-2929 (1980).
K. Bohm, P. Marten, E. Weidel, "Direct Rotation-Rate Detection with a Fibre-Optic Gyro by Using Digital Data Processing," Electronics Letters 19, pp. 997-999 (1983).
"Piezoelectric Technology Data for Designers," Vernitron Piezoelectric Division, pp. 1-5, undated, no author noted.

Primary Examiner—Salvatore Cangialosi
Attorney, Agent, or Firm—Francis J. Maguire, Jr.

[57] ABSTRACT

A piezoelectric phase modulator for a fiber optic sensor is disclosed. The disclosed modulator is capable of relatively large amplitude mechanical vibrations, i.e., having a large converse piezoelectric effect, while at the same time having a relatively predictable and well-behaved direct piezoelectric effect. This result is accomplished by bonding a relatively active piezoelectric material, such as PZT, to a relatively stable piezoelectric material, such as quartz. An optical fiber may then be bonded to the relatively stable material, or to a structure attached thereto, as part of a fiber optic sensor loop. Excitation of the relatively active piezoelectric material will then produce a mechanical vibration in the relatively stable material and in the attached fiber comparable in magnitude to that experienced by the active material. Several embodiments of the invention are shown which are illustrative of devices which may be made according to the teachings disclosed.

16 Claims, 4 Drawing Figures

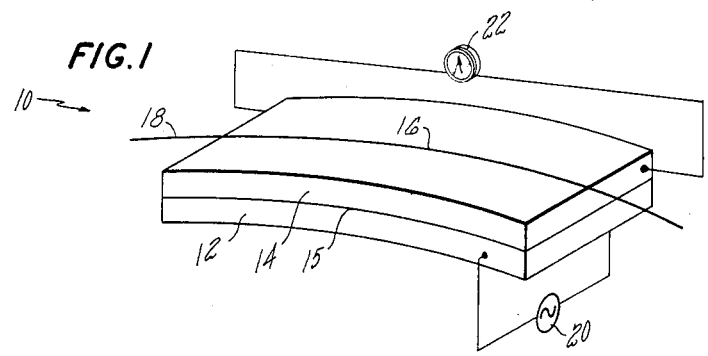
FIG. 1
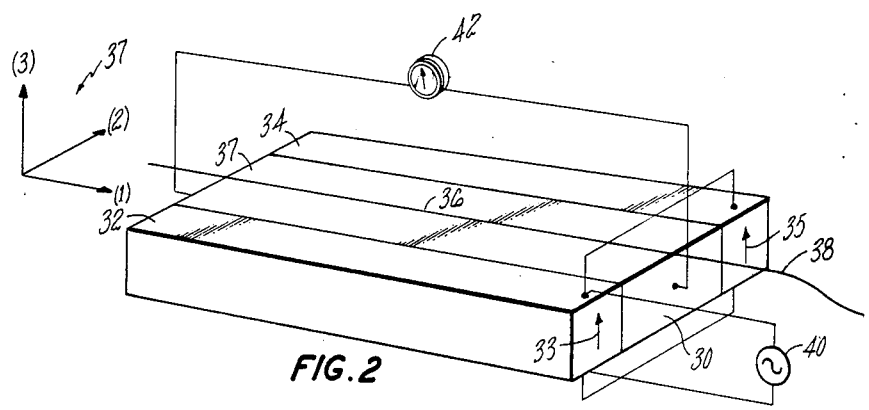
FIG. 2
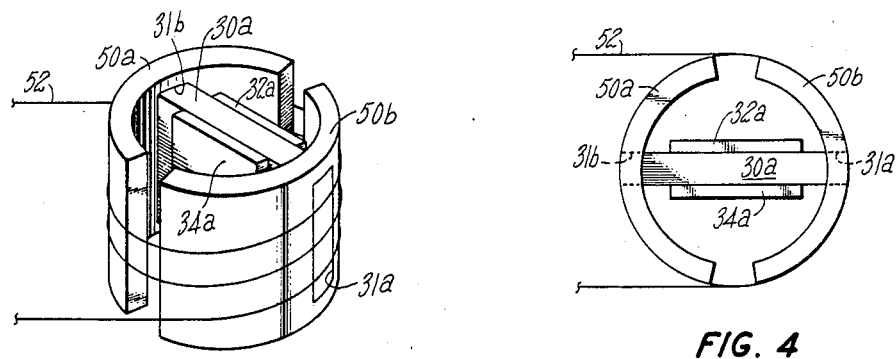
FIG. 3
FIG. 4

PHASE MODULATOR FOR FIBER-OPTIC SENSORS

TECHNICAL FIELD

This invention relates to phase modulators for interferometric fiber-optic sensors and particularly to that class of phase modulators in which the modulation of the phase of the light signal is produced by mechanically modulating the optical path length of the light in the optical fiber.

BACKGROUND ART

In an Interferometric Fiber-Optic Sensor, an optical interferometer is so structured that the physical quantity to be measured induces a phase change in a beam of light traveling in an optical fiber. The phase shifted beam is caused to interfere optically with a reference beam, thereby producing a change in the intensity of the mixed beam which is proportional to the magnitude of the physical variable. Frequently, the measured quantity cannot be determined with sufficient accuracy from a direct measurement of the intensity, and further signal processing is required. A commonly used technique is to introduce an additional known time-varying modulation of the optical phase, and to employ a phase sensitive or lock-in detection scheme. While the technique of phase-sensitive detection is well known and widely applied, the implementation of the technique in practical, compact and sensitive fiber-optic sensors is presently limited by the lack of suitable modulation means. A particular case is the Fiber-Optic Sagnac Interferometer Gyroscope.

In such a device, light from a laser source is split by means of couplers into two coherent counter-propagating beams in a fiber coil. A rotation rate about an axis perpendicular to the coil induces a phase shift between the two counter-propagating beams due to the well known Sagnac effect. The counter-propagating beams interfere in the coupler nearest the coil producing a change in intensity on the detector which is proportional to the rotation rate. To implement a phase sensitive detection scheme, a modulator is placed near one end of the fiber coil to modulate the rotation induced phase difference. An oscillator which drives the modulator also provides a reference signal for the synchronous demodulation of the detector signal in a lock-in amplifier. While various modulation waveforms and frequencies are used, and various schemes for processing the resulting output signal are employed, it is a common feature of these techniques that the gyroscopic scale factor (that is, the factor relating the output signal of the gyro to the rotation rate) is directly related to the amplitude of the impressed modulation. (See e.g., R. Ulrich, "Fiber-Optic Rotation Sensing with Low Drift", Optics Letters 5, pp 173-175 (1980). Consequently, if this technique is to be used in a practical gyroscope, means for determining and controlling the magnitude of the phase modulation with an accuracy appropriate to the particular instrument is required.

In many Fiber-Optic Gyroscopes disclosed in the technical literature, phase modulation is accomplished by wrapping one or more loops of the optical fiber around a small hollow cylinder of PZT (lead zirconate titanate) piezoelectric ceramic placed at one end of the sensing coil. The cylinder is then driven in a manner to produce expansion of the circumference. The resulting stretching of the fiber modulates the optical path length and induces a relative optical phase shift between the counter-propagating beams. Use of such a PZT Modulator in a optical telemetry system has been described by D. E. N. Davies and S. Kingsley in "Method of phase modulating signals in optical fibers; application to optical telemetry systems", Electronics Letters 10, pages 21-23 (1974).

Another application was demonstrated by D. A. Jackson, R. Priest, A. Dandridge and A. B. Tveten in "Elimination of drift in a single mode optical Fiber interferometer using a piezoelectrically stretched coiled fiber", Applied Optics 19, pages 2926-2929 (1980). Application in a Fiber-Optic Gyro has been described by several authors, e.g., Ulrich, "Fiber-Optic rotation sensing with low drift", Optics Letters 5, pages 173-175 (1980).

While the PZT ceramic exhibits a large converse piezoelectric effect and therefore, provides a convenient means for producing the required stretching of the fiber, the ceramic has poor environmental stability and exhibits changes in sensitivity with temperature and aging. Hysteresis effects also are observed on cycling. These effects preclude the use of such a modulator in, for example, a gyroscopic instrument which must exhibit scale factor stability over a broad range of environmental conditions and also must have a useful life of several years, without some means for stabilizing the modulation.

Schemes for controlling the magnitude of the phase modulation have been disclosed which involve the detection and processing of the output signal at a number of the higher harmonic frequencies. (E.g., K. Bohm, P. Marten, E. Weidel and K. Petermann, "Direct rotation rate detection with a fiber-optic gyro by using digital data processing", Electronics Letters 19, pages 997-999 (1983). However, extensive complex electronics is required to implement this approach.

While use of a more well behaved piezoelectric material potentially could provide means to determine and control the modulation amplitude, the magnitudes of the converse piezoelectric sensitivity of quartz, the most stable crystal, is only about one percent that of commonly available PZT ceramic compositions.

DISCLOSURE OF THE INVENTION

It is an object of the present invention to provide an improved piezoelectric phase modulator for use in fiber-optic gyroscopes or in other fiber-optic sensors requiring precise knowledge and control of the magnitude of the phase modulation.

It is a further object of the present invention to provide a modulator having both a large converse piezoelectric effect and a well characterized, direct piezoelectric effect having a relatively environmentally stable output signal which can be used to measure and control the magnitude of the phase modulation.

Another object of the present invention is to provide a small light weight modulator suitable for use in compact instruments.

Yet another object of the present invention is to produce a modulator capable of operation in adverse environments.

In accord with the present invention, a multi-layer laminated modulator is constructed, one layer of which is made from a piezoelectric material which is well behaved, i.e., with a direct piezoelectric effect which can be well characterized with respect to variation with aging and with respect to variation with environmental effects (e.g., temperature). This material need not have a large piezoelectric converse sensitivity, that is, the mechanical deformation in response to an applied excitation signal need not be large. The remaining layers are made from a piezoelectric material which should exhibit a relatively large converse piezoelectric sensitivity, although the piezoelectric behavior need not be well behaved or well characterized. These two piezoelectric materials may be of a form convenient for lamination, e.g., in the form of thin plates or bars. The plates or bars are bonded together in such a manner that strain induced in the poorly behaved piezoelectric material, when subjected to excitation from a suitable voltage source, is transmitted effectively to the well behaved piezoelectric material. Strands of fiber are rigidly affixed to the well behaved piezoelectric plate so that strain in the plate is transmitted to the fiber. Further, electrodes are affixed to appropriate faces of the well behaved plate or bar so that the direct piezoelectric effect signal associated with mechanical deformation of the plate can be measured.

Used as a modulator, excitation is applied to electrodes affixed to faces of the strongly piezoelectric (but poorly behaved, with respect to the direct piezoelectric effect) plates. The resulting strain is transmitted to the well behaved piezoelectric and to the fiber. As a result, substantial stretching of the fiber is achieved. Furthermore, the piezoelectric signal measured across the well behaved plate provides a measure of the magnitude of the stretch imparted to the fiber and additionally provides a signal which can be confidently used in a control loop to maintain the modulation amplitude at a desired value.

In accord with the principles enumerated above, various physical embodiments are possible.

Thus, in further accord with the present invention, a two-layer laminate embodiment is constructed of two different piezoelectric materials, one having a large converse piezoelectric effect with poor stability and the other having a small converse piezoelectric effect with relatively good stability. Each half of the laminate may have a flat shape, e.g., thin rectangular plates. They are bonded together using a highly elastic material for good strain transmission. The fiber to be stretched is rigidly bonded to the more stable layer. Excitation is applied by means of electrodes adhered to appropriate faces of the less stable layer of the laminate. The bending modulation action can be described as a flexural vibration of the laminated plates and results in a flexural stretching of the optical fiber. Additionally, the flexing of the well behaved plate results in the generation of a piezoelectric signal across the faces of that plate. Because the optical fiber is rigidly attached to the stable plate, the induced signal provides an accurate measure of the change in the fiber length under all environmental conditions. Because the dimensional changes of the stable plate which are forced by the driver plate are relatively large, the resulting piezoelectric signal is also large and can be conveniently used to measure the modulation amplitude and to provide a signal which can be employed in a servo loop to control that amplitude at a desired level.

In further accord with the present invention, a linear stretch modulator embodiment is constructed of an inner piezoelectric plate of a material having good stability but small converse piezoelectric effect (the "meat") sandwiched between two piezoelectric plates having a relatively large converse piezoelectric effect (the "bread") but having poor stability. The appropriate faces of each outside plate or "bread" piece have electrodes adhered thereto and these plates are driven in parallel from an excitation source. The poled "polarities" of the two "bread" pieces are oriented in the same direction in order to cancel the bending phenomenon obtained with the two layer device described above. I.e., because of the symmetry of the structure and of the excitation, the bending tendencies of the two "bread" pieces are opposed and a longitudinal stretching mode results. One or more strands of optical fiber are rigidly bonded to an edge of the "meat" of the sandwich and high degree of linear stretching is thereby achieved. Again, the piezoelectric signal induced in the plate of the well behaved piezoelectric material provides an accurate measure of the stretch of the attached fiber and provides a convenient signal for use in a control loop.

In still further accord with the present invention, a loop expander modulator embodiment is constructed using the "sandwich" concept disclosed above in combination with a split cylinder, each half of which is bonded to an opposite end of the "meat" of the "sandwich." The drive signal is the same as for the "sandwich" but the optical fiber is wrapped in tension around the split cylinder and bonded thereto. The split cylinder is made of a material with thermal expansion similar to the of the stable piezoelectric material, and may be the same as the "meat" of the "sandwich".

For purposes of monitoring and controlling the amplitude of vibration of all of the above structures, the induced piezoelectric signal in the well behaved piezoelectric plate is monitored. From this signal the amplitude of the vibration can be determined with precision because the variations in the piezoelectric properties of the well behaved material resulting from environmental or aging effects can be well characterized and appropriate corrections can be applied. Thus, the signal can be utilized in a control loop to adjust the PZT drive signal and thereby to obtain a desired inferred expansion with confidence under all environmental conditions.

Thus, an improved piezoelectric phase modulator for use in fiber-optic gyroscopes or in other fiber-optic sensors is provided. By using a well behaved and highly stable piezoelectric material upon which to attach the optical fiber, the necessary precise knowledge of the magnitude of the phase modulation is obtained under all environmental conditions.

These and other objects, features and advantages of the present invention will become more apparent in light of the detailed description of a best mode embodiment thereof, as illustrated in the accompanying drawing.

BRIEF DESCRIPTION OF THE DRAWINGS

FIG. 1 is an illustration of a bilayer modulator according to the present invention;

FIG. 2 is an illustration of a linear stretch modulator according to the present invention;

FIG. 3 is a perspective view of a loop expander modulator according to the present invention; and FIG. 4 is a plan view of the loop expander modulator of FIG. 3.

BEST MODE FOR CARRYING OUT THE INVENTION

FIG. 1 is a simplified illustration of a bilayer modulator 10, according to the present invention. A first piece 12 in the shape of a thin rectangular plate is made of a first piezoelectric material having a relatively large converse piezoelectric effect but also having relatively poor stability. Typically, this would be made of lead zirconate titanate (PZT) which is a piezoelectric ceramic having a multicrystalline, amorphous structure. A second piece 14 having a shape similar to the first piece 12 is bonded to the first piece at an interface 15 surface therebetween. The second piece is made of a second piezoelectric material having more stability but a lesser converse piezoelectric effect. Typically, the second material would be crystalline quartz which has a single crystal, nonamorphous structure. The first and second pieces are bonded with a highly elastic material in order to obtain good strain transmission. One technique is to use a polymeric adhesive such as epoxy which can be done at low temperatures. A disadvantage of these adhesives is that they may not transmit high frequency vibrations effectively and that low modulation efficiency at high frequencies could result. A frit glass may also be used to bond the two pieces. This involves spreading a powdered glass, which melts at a relatively low temperature, between the two plates and firing the interface so as to melt the glass and form a bond upon cooling. Another technique for bonding the two piezoelectric materials involves metallizing each piece on the face to be bonded and then bringing the metallized faces into contact and heating the structure to melt the metal and form a bond.

To bond the optical fiber to the second material a channel 16 is cut or etched in the second material and a frit glass technique is also used to bond an optical fiber 18 to the second piece 12 by spreading powdered glass in the channel, laying the optical fiber (from which the usual protective plastic jacketing has been removed) over the powdered glass in the channel and melting the glass so as to bond the fiber in the channel upon cooling. Metallization of the fiber and of the face of the piezoelectric material to which the fiber is to be bonded followed by contacting of the metallized fiber with this face and heating of the structure is another method for fiber bonding.

A sinusoidal source 20 or other time-varying excitation voltage source is used to excite the first piece 12 on each side so as to produce a flexural vibration mode in the plate 12. The bilayer device of FIG. 1 is shown (exaggerated) in a flexed position due to such excitation. The second piece 14, being bonded to the first piece 12, also experiences a flexural vibration. The polarity of the ceramic plate 12 is oriented with respect to the applied excitation in such a way as to produce, among others, lengthwise and widthwise vibrations which, because of the resistance to the vibrations on the part of the quartz 14, causes a bending or buckling effect.

A voltmeter 22 is shown to conceptually indicate measurement of the induced voltage generated by virtue of the direct piezoelectric effect in the second piece 14 as a result of the stresses caused by the flexing of the first piece 12. This measured signal may be actually used in a feedback control circuit (not shown) to control the amplitude of the excitation source 20 to produce a desired mechanical flexing effect in the second piece 12. Since the second piece has well behaved and relatively stable environmental characteristics, any inferences concerning the degree of mechanical flexing in the second piece can be made with the desired precision. These inferences, of course, will be drawn from the various piezoelectric voltages induced in the second piece upon being stressed.

FIG. 2 is an illustration of another embodiment of the present invention in which a longitudinal vibration mode of an environmentally stable plate 30 is induced. As is well known in the art of piezoelectric crystals, various vibration modes of bars and plates exist and can be selected to meet a wide variety of needs. Orientation of the crystal structure of a crystalline material or orientation of the poled direction of a ceramic material and positioning of the excitation are a few of the considerations which must be taken into account in selecting which piezoelectric crystal is suited for the particular symmetry of the device in question. In this case, a quartz plate 30 is selected for sandwiching between two PZT plates 32, 34 which have less environmental stability but a much larger converse piezoelectric effect. Of course, other well behaved materials could be chosen as well. A channel 36 is etched or cut in the center piece 30 along a face 37 and an optical fiber 38 is laid in the channel and bonded with frit glass in the channel in the face 37 for longitudinal stretching. Of course, as described above, other bonding techniques may be used as well.

The stretching is accomplished by applying an excitation source 40 to the top surfaces and the bottom surfaces of the outside plates 32, 34 as shown in FIG. 2. Electrodes may be deposited on the flat surfaces of the plates 32, 34 for this purpose. The polarities of the two plates 32, 34 are pointing in the same direction as shown by arrows 33, 35. This "poled" direction corresponds to the (3) direction illustrated by a coordinate system 37.

A voltmeter 42 is shown connected to the center piece 30 to conceptually indicate measurement of the direct piezoelectric effect voltage caused by the strains mechanically transmitted through the bonds between the plates by the converse piezoelectric effect in the outer plates 32, 34. This signal may be actually used as a feedback signal in a feedback control circuit (not shown) for controlling the amplitude of the excitation voltage of the source 40 in a manner similar to that described in connection with FIG. 1.

The set of axes 37 are chosen in accordance with the convention that the "(3)" axis is in the direction of poling. If a voltage source 20 having an amplitude V is applied to the electrodes of the ceramic bars 32, 34 as shown, and the ceramic bars are of a length I, and thickness t, then the change in length L is given by $$\Delta L^{PZT} = d_{31}^{PZT} \left[ \frac{L^{PZT}}{t^{PZT}} \right] V^{PZT}.$$

Here, $d_{31}^{FZT}$ is the piezoelectric constant which measures the change in the length dimension in the "(1)" direction when an electric field is applied in the "(3)" direction. As a concrete example, for a particular PZT composition with a very large piezoelectric effect, $d_{31} = -274 \times 10^{-12}$ meters/volt. For a 1 cm long bar having a 3 mm thickness, $$\frac{\Delta L^{PZT}}{V^{PZT}} = 9.1 \text{ Å/volt}.$$

This change in length, though small, can produce substantial modulation of the optical path length. If more than one strand of fiber is attached to the modulator, the stretch would be experienced by each strand of fiber. For example, a typical cladding diameter for commercial optical fiber is 80 microns. If the inner (e.g., quartz) bar 30 is 33 mm wide (along the "(2)" dimension), then 37½ loops (0.3/0.4008) could be adhered, side by side, to each exposed face (top and bottom). Assuming a lesser number of fiber loops, e.g., 20 loops, then the total stretch would be 182 microns/volt. For an interferometer utilizing a HeNe laser with a wave length of 6328 Angstrom units, a drive voltage of 35 volts would produce a full wavelength modulation. This is a substantial and very useful magnitude for interferometric modulation purposes. In addition, more stretch could be obtained by using additional bars in series.

Of course, the force supplied by the outside ceramic bars (drivers) must be adequate to overcome the stiffness of the inner bar 30. If we assume again PZT drivers and a quartz inner bar, the force which must be overcome is:

$$F^Q = \left[ \frac{\Delta L^Q}{L^Q} \right] Y^Q A^Q,$$

and the overcoming force is:

$$F^{PZT} = \left[ \frac{\Delta L^{PZT}}{L^{PZT}} \right] Y^{PZT} A^{PZT},$$

where,
$Y^Q$ is Young's modulus for quartz,
$A^Q$ is the cross sectional area of the quartz,
$Y^{PZT}$ is the Young's modulus for PZT, and
$A^{PZT}$ is the cross sectional area of PZT.

If the quartz and the PZT bars are the same length, and the change in length of the PZT is transmitted 100% to the quartz, then for a three layer device with two drive bars, as shown in FIG. 2, the condition for force balance becomes $$2F^{PZT} = F^Q$$

$$= 2 \left[ \frac{A^{PZT}}{A^Q} \right] \left[ \frac{Y^{PZT}}{Y^Q} \right] F^Q$$

Since tor PZT, $Y^{PZT} = 7.1 \times 10^{10}$ newton/meter$^2$; and for quartz, $Y^Q = 8.26 \times 10^{10}$ newton/meter$^2$, $$2F^{PZT} = 1.7 \left[ \frac{A^{PZT}}{A^Q} \right] F^Q.$$

Thus, the drive is adequate if $A^Q/A^{PZT}$ is less than 1.7. As an example, the cross sectional area of the quartz could be chosen to be the same as that of the PZT.

Of course, the strength of the quartz must be sufficient so that the drivers do not break it. The tensile strength of quartz is $1.1 \times 10^8$ newton/m$^2$. The tensile stength of PZT (dynamic) is $2.8 \times 10^7$ newton/m$^2$. For a 50 volt drive on a particularly active PZT type (e.g., VERNITRON's PZT-5H), the $$\text{Applied Stress } (PZT) = \frac{50(9.1)10^{-8}}{1} (7.1 \times 10^{10})$$

$$= 3.23 \times 10^5 \text{ newton/m}^2.$$

For 100% strain transmission to quartz, the $$\text{Applied Stress (Quatrz)} = \left[ \frac{50(9.1)(10^{-8})}{1} \right] (8.2 \times 10^{10}) \text{ m}$$

$$= 3.76 \times 10^5 \text{ newton/m}^2$$

Therefore the tensile strength of the quartz is not exceeded under the drive conditions of the example.

One may also calculate the control voltage per length of stretch obtained as follows:

$$\frac{V}{L} = g_{33} \left[ \frac{\Delta L}{L} \right] Y$$

$$V^Q = (49 \times 10^{-3})(10^{-10})(8.26 \times 10^{10} \text{ newt/m})$$

$$V^Q = 0.4 \text{ V/Angstrom, of stretch}$$

where $g_{33} = d_{33}/\epsilon = 2 \times 10^{-12}/4.6(8.85 \times 10^{-12})$ $$= 49 \times 10^{-3}$$

Thus, the example shows a viable device which requires 0.4 V per Angstrom of stretch.

FIG. 3 is a perspective illustration of a variation of the structure shown in FIG. 2. In addition to a "sandwich" structure as shown in FIG. 2, generally indicated in FIG. 3 by similar numerals except followed by the suffix "a", an additional split cylinder 50a, 50b is added. Each half of along split cylinder is attached to one end of the center piece 30a by suitable bonding techniques as described above. The center piece 30a may be passed through holes 31a, 31b in each half of the split cylinder 50b, 50a, respectively. An optical fiber 52 is wrapped around the outside of the split cylinder and bonded thereto by frit glass or other adhesive techniques similar to those described above. A plan view of the structure of FIG. 3 is shown in FIG. 4.

The invention disclosed herein combines the advantages of the strong converse piezoelectric effect in, for example, PZT, for drive purposes, with the superior stability of the direct piezoelectric effect in, for example, quartz, for monitoring and control by means of the direct piezoelectric effect in a laminated modulator structure.

Although the devices disclosed herein have been described in certain places as made of PZT and quartz, it will be understood by those skilled in the art that other materials such as barium titanate, lead metaniobate, or lead titanate ceramics could be used for the first material and crystalline lithium niobate or other similar crystalline piezoelectric materials could be used for the second material.

Although the invention has been shown and described with respect to a best mode embodiment thereof, it should be understood by those skilled in the art that the foregoing and various other changes, omissions and delections in the form and detail thereof may be made therein without departing from the spirit and scope of this invention.

We claim:
1. A piezoelectric phase modulator for having an optical fiber bonded thereto for use in a fiber-optic sensor, comprising:
   a first piece made of a first piezoelectric material; and
   a second piece made of a second piezoelectric material having greater stability but a lesser converse peizoelectric effect than said first piece, said second piezoelectric piece bonded to said first piezoelectric piece so that said second piece will experience a converse piezoelectric effect comparable in magnitude to that of said first piece when said first piece is subjected to suitable excitation which tends to bend both pieces, said second piece having a channel for having the optical fiber bonded to said second piece therein.

2. The modulator of claim 1, further comprising a third piece made of the same or a similar piezoelectric material as said first piece, said third piece bonded to said second piece opposite to said first piece whereby said second piece will experience a predominently longitudinal vibration mode when said first and third pieces are subjected to suitable excitation.

3. The phase modulator of claim 2, wherein said first, second and third pieces are rectangular slabs and said second piece is sandwiched between said first and third pieces.

4. The phase modulator of claim 3, wherein each half of a split hollow cylinder made of said second piezoelectric material is bonded to one end of said second piece for having an optical fiber loop wrapped around the outside of said split cylinder and bonded thereto.

5. The phase modulator of claim 1, wherein said first and second pieces are rectangular slabs bonded face to face.

6. The phase modulator of claim 1, further comprising:
   excitation means, for providing a two wire, time-varying electrical output signa; and
   electrode means, attached to each face of said first piece, responsive at each opposite face to an opposite one of the two wires of said output signal.

7. The phase modulator of claim 6, further comprising:
   means for sensing the piezoelectric effect experienced by said second piece and for providing a feedback signal indicative of the magnitude thereof; and
   control means, responsive to the magnitude of said feedback signal for controlling the magnitude of said excitation output signal to provide a stable direct piezoelectric effect in said second piece.

8. A laminated piezoelectric phase modulator for use in a fiber-optic sensor, comprising:
   one or more layers of a first piezoelectric material; and
   at least one layer of a second piezoelectric material having greater stability but a lesser converse piezoelectric effect than said first piece, said second material layer or layers being bonded to said first layer or layers to make a multi-layered laminate such that said second material layer or layers will experience a strain when said first material layer or layers are subjected to excitation, at least one layer of said second piezoelectric material having a channel for having an optical fiber bonded to said layer of said second material therein.

9. The modulator of claim 8, wherein said one or more layers of a first piezoelectric material comprises one layer of said first piezoelectric material, and wherein said at least one layer of a second piezoelectric material comprises one layer of said second piezoelectric material, said layers being bonded together to form a bilayer device for exhibiting a flexural bending mode of vibration under excitation of said first piezoelectric material.

10. The modulator of claim 9, further comprising a third layer made of the same piezoelectric material as said first layer, said third layer bonded to said second layer opposite to said first layer whereby said second layer will experience a predominately longitudinal vibration mode when said first and third layers are subjected to excitation.

11. The phase modulator of claim 10, wherein said first, second and third layers are rectangular bars and said second layer is sandwiched between said first and third layers.

12. The phase modulator of claim 11, wherein each half of a split hollow cylinder made of a third material is bonded to one end of said second bar for having an optical fiber loop wrapped around the outside of said split cylinder and bonded thereto.

13. The phase modulator of claim 12, wherein said split hollow cylinder is made from said second piezoelectric material.

14. The phase modulator of claim 8, wherein said first and second pieces are rectangular bars bonded face to face.

15. The phase modulator of claim 8, further comprising;
   excitation means, for providing a two wire, time-varying electrical output signal; and
   electrode means, attached to appropriate faces of said first material, responsive at each opposite face to an opposite one of the two wires of said output signal.

16. The phase modulator of claim 8, further comprising:
   means for sensing the piezoelectric effect experienced by said second piezoelectric material and for providing a feedback signal indicative of the magnitude thereof; and
   control means, responsive to the magnitude of said feedback signal for controlling the magnitude of said excitation output signal to provide a stable direct piezoelectric effect in said second piece.

* * * * *

UNITED STATES PATENT AND TRADEMARK OFFICE
CERTIFICATE OF CORRECTION

PATENT NO. : 4,703,287

DATED : 10/27/87

INVENTOR(S) : Joseph T. Fournier, Jr. et al

It is certified that error appears in the above-identified patent and that said Letters Patent is hereby corrected as shown below:

Column 6, line 46.  Cancel "I" and substitute -- L --

Column 6, line 52.  Cancel "FZT" and substitute -- PZT --

Column 7, line 3.  Cancel "(0.3/0.4008)" and substitute -- (0.3/0.008) --

Column 7, line 46.  Cancel "tor" and substitute -- for --

Column 7, line 59.  Cancel "stength" and substitute -- strength --

Column 9, claim 6, line 32.  Cancel "signa" and substitute -- signal --

Column 9, claim 1, line 1.  Cancel "peizoelectric" and substitute -- piezoelectric --

Signed and Sealed this

Tenth Day of January, 1989

Attest:

DONALD J. QUIGG

Attesting Officer

Commissioner of Patents and Trademarks